(12) United States Patent
Bale (10) Patent No.: US 9,753,166 B2
(45) Date of Patent: Sep. 5, 2017

(54) P-WAVE AND S-WAVE SEPARATION OF SEISMIC DATA IN THE PRESENCE OF STATICS AND IRREGULAR GEOMETRY

(71) Applicant: CGG SERVICES SA, Massy (FR)

(72) Inventor: Richard Bale, Calgary (CA)

(73) Assignee: CGG SERVICES SAS, Massy (FR)

( * ) Notice: Subject to any disclaimer, the term of this patent is extended or adjusted under 35 U.S.C. 154(b) by 563 days.

(21) Appl. No.: 14/282,268

(22) Filed: May 20, 2014

(65) Prior Publication Data

US 2015/0338536 A1 Nov. 26, 2015

(51) Int. Cl.
*G01V 1/28* (2006.01)
*G01V 1/32* (2006.01)
*G01V 1/30* (2006.01)

(52) U.S. Cl.
CPC .............. *G01V 1/284* (2013.01); *G01V 1/303* (2013.01)

(58) Field of Classification Search
CPC .. G01V 1/28; G01V 2210/51; G01V 2210/67; G01V 1/284; G01V 1/303
USPC ............ 702/14, 17, 66, 67, 70, 190; 367/47
See application file for complete search history.

(56) References Cited

U.S. PATENT DOCUMENTS 4,648,039 A * 3/1987 Devaney ................ G01V 1/286
367/47

OTHER PUBLICATIONS

P.W. Cary, "P/S Wavefield Separation in the Presence of Statics", CREWES Research Report, 1998, pp. 30-1-30-8, vol. 10.
J.W.M. Dankbaar, "Separation of P- and S-Waves", Geophysical Prospecting, 1985, pp. 970-986, vol. 33.
M.S. Donati, "Synthetic Example of the Benefits of P-SV AVO Analysis in the Glauconitic Channel—Blackfoot Field, Alberta", EAGE 59th Conference and Technical Exhibition, Geneva, Switzerland, May 26-30, 1997, Petroleum Division.
S.E. Guevara et al., "A Method for P-P and P-S Mode Separation in the Presence of Statics", SEG, Expanded Abstracts, 2000.

* cited by examiner

*Primary Examiner* — John H Le
(74) *Attorney, Agent, or Firm* — Patent Portfolio Builders PLLC (57) ABSTRACT

Methods and systems for separating P-S wave field data are described. Slowness values for the PP mode and the PS mode are estimated and are, typically, unequal based on aliased and/or irregularly sampled data. A calculation, in the space-time domain, based on a matrix of equations, generates separated P-wave and S-wave data. The separated P-wave data and S-wave data are output for further imaging.

20 Claims, 8 Drawing Sheets

P-WAVE AND S-WAVE SEPARATION OF SEISMIC DATA IN THE PRESENCE OF STATICS AND IRREGULAR GEOMETRY

TECHNICAL FIELD

Embodiments of the subject matter disclosed herein generally relate to methods and systems for land-based seismic data processing and, more particularly, to mechanisms and techniques for P-S wave field separation.

BACKGROUND

Land-based seismic data acquisition and processing techniques are used to generate a profile (image) of a geophysical structure (subsurface) of the underlying strata. This profile does not necessarily provide an accurate location for oil and gas reservoirs, but it may suggest, to those trained in the field, the presence or absence of oil and/or gas reservoirs. However the generation of this profile requires a large amount of data processing to be performed on the raw data generated by a seismic survey. Thus, providing an improved image of the subsurface in a shorter period of time via processing of the survey data is an ongoing process.

In performing seismic surveys, elastic waves are generated by the seismic survey equipment whose reflections/refractions are received by devices (geophones) that record them. Such elastic waves include primary waves (P-waves), compressional waves that are longitudinal in nature, and secondary waves (S-waves), shear waves that are transversal in nature and somewhat slower than P-waves.

The theory behind the separation of P wave data and S wave data measured by geophones has been understood for many years. In practice however, the use of this theory in applications associated with land-based seismic data acquisition has lagged far behind. Common practice in land-based seismic data acquisition is to treat the vertical ("V") component as a proxy for the P-wave response and the horizontal ("H") components as proxies for the S-wave response. The basis for these simplifying assumptions for multi-component processing are rooted in the observation that ray paths often arrive at the surface nearly vertically, allowing the near surface of the Earth to operate as a natural P-S wave field separation filter.

In contrast, there are several exploration contexts that have shown the H and V proxy assumption leads to the generation of unacceptable results for land-based seismic data acquisition. For example, permafrost and hard rock surfaces provide contexts where the H and V proxy assumption does not provide an accurate assessment. In fact, any location where a high velocity layer is present at the surface will lead to poor results from the H and V proxy assumption analysis.

In the referenced examples, it is common to observe, at larger offsets, the presence of P-wave energy on the horizontal components and, to a lesser extent, the presence of S-wave energy on the vertical components. It should be noted that the cross-presence of wave energy is based on the fact that under these contexts both P-wave and S-wave modes can arrive on all components. The two fundamental reasons that P-S wave field separation has not been adopted for practical applications are statics and spatial sampling.

Figures 1A, 1B:
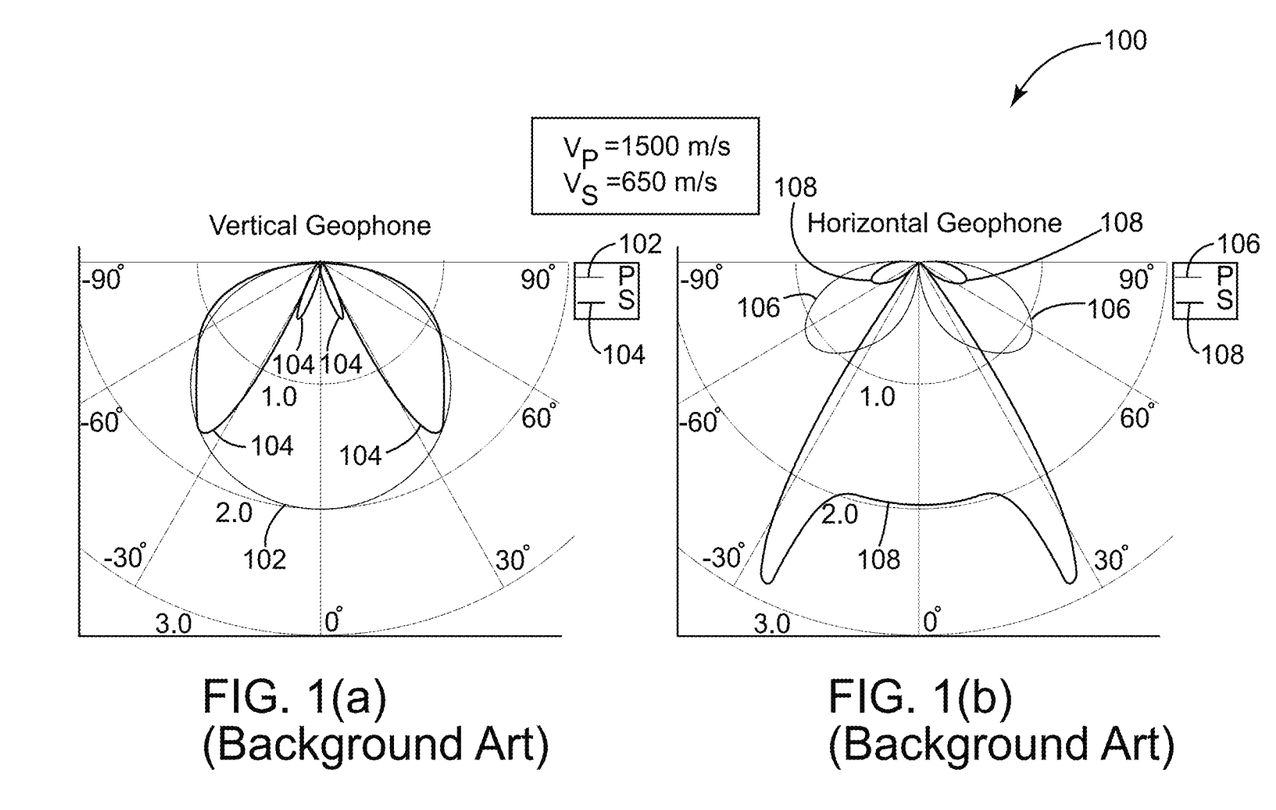

To better understand this concept, and looking to background FIG. 1, FIG. 1(a) depicts a radiation pattern for P 102 and S 104 waves measured at the free surface for a vertical geophone and FIG. 1(b) depicts a radiation pattern for P waves, 106 and S waves, 108 measured at the free surface for a horizontal geophone. It should be noted that the free surface in these depictions is defined as the air-ground interface and the depictions are based on a paper by Dankbaar, J. W. M. (hereafter referred to simply as "Dankbaar"), entitled "Separation of P- and S-Waves", in Geophysical Prospecting, 1985, vol. 33, pp. 970-986, the disclosure of which is incorporated herein by reference.

The complexity of the patterns illustrated in FIGS. 1a and 1b is based on solving the equations of motion in the presence of the free surface. At vertical incidence, only the P wave 102, 106 is measured on the vertical component but with double amplitude. Similarly, at horizontal incidence, only the S wave 104, 108 is measured on the horizontal component and also with double amplitude. It should be noted that the doubling of amplitude is the most obvious manifestation of the free surface effect as the upward waves are reflected by the free surface and coincide with the downward waves.

Dankbaar proposed a method to separate P waves 102, 106 and S waves 104, 108 based on the depicted patterns. The radiation patterns are functions of the slowness, i.e., "ray-parameter," and surface P-velocities and S-velocities and can be inverted for a given slowness. The resulting operators can be applied in the F-K domain or they can also be applied in the tau-p domain after a radon transform, as described in a paper by Donati, M. S., 1997, entitled "Synthetic Example of the Benefits of P-SV AVO Analysis in the Glauconitic Channel-Blackfoot Field, Alberta," published in the 59th EAGE Meeting, Geneva, Extended Abstracts, 2, C014 and incorporated herein by reference.

There are two fundamental assumptions implicit in the direct application of the inverse filters in the F-K domain or the tau-p domain. First, the data must be adequately and regularly sampled and second, the wave fields must be well represented as plane-waves at the surface where they are recorded. In practice, both of these assumptions can prove to be problematic. Regarding the first assumption, typical land acquisition has receivers which are well sampled in only one direction. Regarding the second assumption, the presence of statics tends to impair the representation of the wave fields as plane-waves at the surface where they are recorded. The statics problem is complicated by the fact that the separation filters depend on the slowness value at the receivers and requires performing the F-K domain or tau-p domain transform for common shot data. Satisfying the plane wave assumption would require first removing the receiver statics but this task cannot be accomplished correctly for both P and S statics until after separation.

An alternative approach is to assume that the slowness is identical at the source and the receiver and apply the separation in the receiver domain but additional problems arise with this implementation. First, the receiver gathers are more likely to be spatially aliased and second, the assumption of common slowness at the source and the receiver is only valid for a layered medium. In general, the slowness for a reflection is different on the source and receiver sides.

The problem of P-S separation in the presence of statics was previously examined by Cary, P. W., 1998, in his paper entitled "P/S wavefield separation in the presence of statics," CREWES Research Report, Vol. 10, 30-1 to 30-8 and incorporated herein by reference and by Guevera, S. E. and Cary, P. W., 2000, in their paper entitled "A method for P-P and P-S mode separation in the presence of statics," SEG Expanded Abstracts, 1225-1228 and incorporated herein by reference. This research proposed an adapted F-K domain/tau-p domain method in which a forward model equation describes the mapping from plane-wave data to space-time data including both statics and P-S combination and the inversion of the forward model equation. Although this model is designed to be applied in the shot domain, it assumes that statics can be determined prior to separation and that the data are well sampled spatially in the shot domain.

Accordingly, it would be desirable to provide systems and methods that avoid the afore-described problems and drawbacks, and improve the accuracy of the final image.

SUMMARY

Based on the foregoing, embodiments provide techniques for, among other things, separating P-wave data and S-wave data in the space-time domain.

According to an embodiment, a method, stored in a memory and executing on a processor, for separating P-wave data and S-wave data comprises estimating, in a space-time domain, a P-wave slowness value and an S-wave slowness value; separating the P-wave data and the S-wave data using the estimated P-wave slowness value and S-wave slowness value; and outputting separated P-wave data and S-wave data.

According to another embodiment, a system for separating P-wave data and S-wave data includes a seismic dataset having vertical component data and horizontal component data; one or more processors configured to execute computer instructions and a memory configured to store the computer instructions wherein the computer instructions further comprise: a slowness value estimation component for estimating a P-wave slowness value and an S-wave slowness value using the seismic data set; an engine component for separating the P-wave data and the S-wave data using the estimated P-wave slowness value and S-wave slowness value; and an output component for outputting separated P-wave data and S-wave data.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 1(a) and (b) are background art of radiation patterns for vertical geophones and horizontal geophones;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of performing P-S wave field separation, e.g., in the presence of statics and irregular geometry. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to provide a context for the subsequent embodiments, a description of aspects and terminology is hereby included. The methods and systems described herein perform separations of P-waves and S-waves, e.g., in the presence of statics and irregular geometry of a subsurface to be imaged. A P-wave is the wave studied in conventional seismic data and is an elastic body wave or sound wave in which particles oscillate in the direction the wave propagates. P-waves incident on an interface at other than normal incidence can produce reflected and transmitted S-waves, otherwise known as converted waves. It should be noted that P-P data is seismic data associated with a propagating P-wave.

An S-wave, generated by most land seismic sources and sometimes as converted P-waves, is an elastic body wave in which particles oscillate perpendicular to the direction in which the wave propagates. S-waves, also known as shear waves, travel more slowly than P-waves and cannot travel through fluids because fluids do not support shear. It should be noted that S-waves can also be converted to P-waves. Recording of S-waves involves receivers coupled to the solid earth and their interpretation can allow determination of rock properties such as fracture density and orientation, Poisson's ratio, and rock type by cross-plotting P-wave and S-wave velocities and other techniques.

In a further description of terminology, a shot point is one of a number of locations or stations at the surface of the earth at which a seismic source is activated. A seismic trace is the seismic data recorded, by one channel, after the seismic source has been fired. The seismic trace represents the response of the elastic wave field to velocity and density contrasts across interfaces of layers of rock or sediments as energy travels from the seismic source through the subsurface to a receiver or receiver array. Further, a seismic inversion is a process of transforming seismic reflection data into a quantitative property description of a strata description of an underground location and possibly a reservoir containing natural resources such as oil or gas.

Further in the context for the subsequent embodiments, it should be noted that the performance of P-S wave field separation as part of the data processing associated with seismic surveying is sometimes needed to provide accurate images associated with the surveyed strata, e.g., under circumstances such as high velocity surface layers. Embodiments described below perform P-S wave field separation in the space-time domain without F-K or tau-p transforms. The exemplary embodiments instead use a more general form of the P-S radiation pattern forward modeling from which to perform separation of the P and S data. Testing of such embodiments with synthetic data has shown the embodiments to be less sensitive to receiver statics than the F-K separation algorithm described above and, also, that the embodiments are also suitable for irregular or sparse spatial sampling.

Such embodiments begin with a more general form of the forward modeling equation given by Dankbaar, but in which the slowness for PP and PS modes, $p_{pp}$ and $p_{ps}$ are not assumed to be equal:

$$\begin{bmatrix} U_V \\ U_H \end{bmatrix} = \begin{bmatrix} R_V^P(p_{PP}) & R_V^S(p_{PS}) \\ R_H^P(p_{PP}) & R_H^S(p_{PS}) \end{bmatrix} \begin{bmatrix} D_P \\ D_S \end{bmatrix}, \quad (1)$$

where $U_V$ and $U_H$ are the vertical component and horizontal component data, $D_P$ and $D_S$ are the desired P-wave and S-wave data, and the terms in the matrix are $$R_V^P(p_{PP}) = \frac{-2\gamma\xi(1-2V_S^2 p_{PP}^2)}{R_0(p_{PP})}, \; R_V^S(p_{PS}) = \frac{4V_S p_{PS}\xi\eta}{R_0(p_{PS})} \quad (2)$$

$$R_H^P(p_{PP}) = \frac{4V_P p_{PP}\xi\eta}{R_0(p_{PP})}, \; R_H^S(p_{PS}) = \frac{2\eta(1-2V_S^2 p_{PS}^2)}{R_0(p_{PS})}.$$

where $\gamma$ equals Vp/Vs, $\xi$ equals $$\left(\frac{V_S}{V_P} - V_S^2 p^2\right)^{1/2},$$

$V_S$ equals an S-wave velocity, $V_P$ equals a P-wave velocity, $p_{PP}$ is a slowness value for said PP mode, $p_{PS}$ is a slowness value for PS mode, $R_0$ equals $(1-2Vs^2p^2)^2+4p^2Vs^2\xi\eta$ and $\eta$ equals $(1-Vs^2p^2)^{1/2}$. In these definitions, p refers to the appropriate ray parameter for the term considered. For example, when $\xi$ refers to the definition of the $R_{vp}(p_{pp})$ term, p is $p_{pp}$. It should be noted in the embodiment of equation (2) that most of these variables are also defined in the above-incorporated by reference Dankbaar. The modifications to the modeling equation of Dankbaar described enable this equation to now be valid in the space-time domain where coincident PP and PS arrivals have different slowness values, unlike the F-K and the tau-p domains. More specifically, in the Dankbaar paper equations (1) and (2) are expressed as a function of the generic ray-parameter p and not as a function of pPP and pPS. Therefore, the equations in the Dankbaar paper are only applicable in the tau-p domain, where ray-parameter traces are directly estimated by the tau-p transformation, or in the FK domain where the ray-parameter is given by the ratio of wavenumber to frequency. Instead, equations (1) and (2) above are expressed as a function of pPP and pPS, and can be implemented in the x-t domain provided that an estimate of pPP and pPS can be obtained. This estimate can be obtained by, for example, ray-tracing, as explained in the next paragraph.

In equation (2), the space-time values of $p_{pp}(x, t)$ and $p_{ps}(x, t)$ can be estimated in a number of ways, including by ray-tracing and directly from the normal moveout (NMO) equation. It should be noted in this embodiment that the first term in equation (2), i.e., $R_V^P(P_{pp})$, is the amplitude factor for PP measured on a vertical geophone, and its reciprocal can be used to correct for emergence angle amplitude decay when only the vertical component is present. It should also be noted in the embodiment that although angle of emergence correction addresses the amplitude effect, it also gains large offset noise on the P-wave data whereas PS separation generally does not incur the offset noise. Accordingly, when horizontal receivers are present, a more complete separation can be performed by inverting equation (1) and solving for the P-wave data $D_P$ and S-wave data $D_S$ as:

$$\begin{bmatrix} U_V \\ U_H \end{bmatrix} \begin{bmatrix} R_V^P(p_{PP}) & R_V^S(p_{PS}) \\ R_H^P(p_{PP}) & R_H^S(p_{PS}) \end{bmatrix}^{-1} = \begin{bmatrix} D_P \\ D_S \end{bmatrix} \quad (3)$$

The seismic data processing methods and techniques described according to these embodiments are, among other things, a function of space, i.e., offset, and time, and therefore the embodiments are sometimes referred to as an "XT" method. The embodiments described herein assume layered media, but this assumption could be generalized to use ray-tracing in a more general depth model. It should be noted in the embodiment that because the data are not transformed into the F-K domain or the tau-p domain, there is not a reliance on the assumption of local plane wave behavior and therefore this solution is not sensitive to the presence of statics. In another aspect of the exemplary embodiment, there is no risk of spatial aliasing causing incorrect application of the separation filter as occurs in the F-K domain and the tau-p domain.

A generalized embodiment for implementing these embodiments in hardware and/or software will now be described with respect to FIGS. 2-7. Looking now to FIG. 2, a context diagram illustrates the previously described aspects. A PS separation system 200 according to an embodiment comprises a slowness value estimation component 202, an engine component 204, vertical and horizontal wavefield dataset component 206 and a P- and S-wave data output component 208. The embodiment slowness value estimation component 202 uses a preconfigured technique to estimate the space-time values, i.e., the P-wave slowness value and the S-wave slowness value, for the PP mode and the PS mode. It should be noted that the P-wave slowness and the S-wave slowness values are typically not equal.

Figure 2:
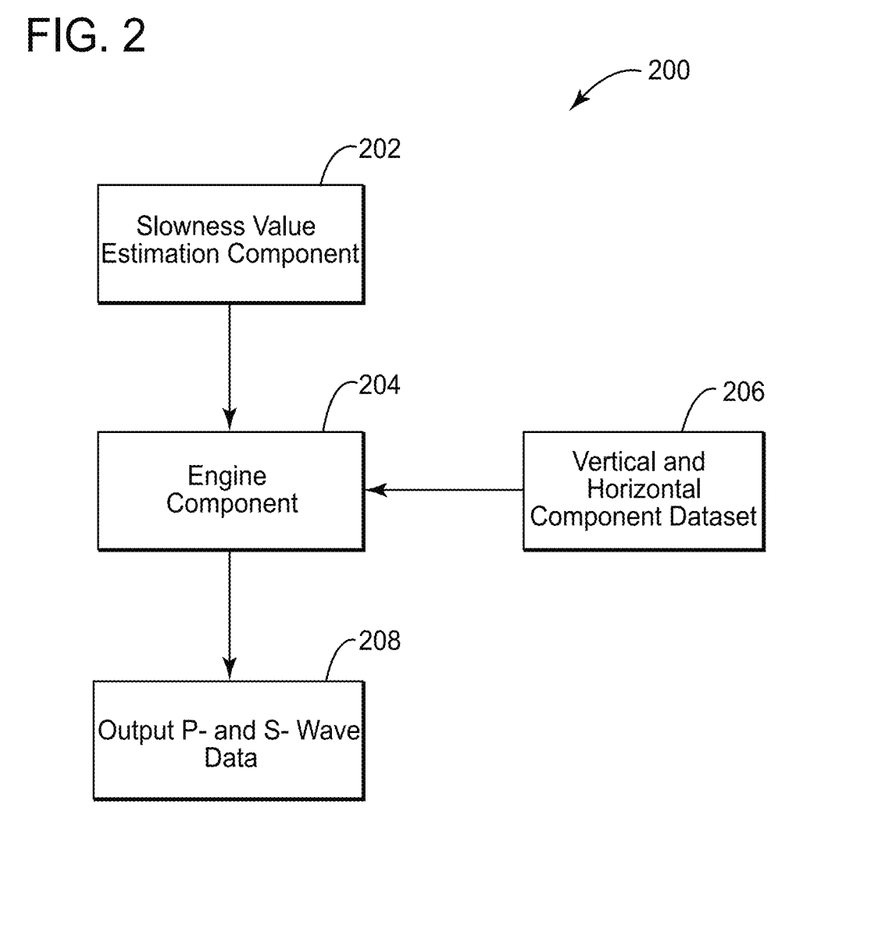
FIG. 2 is a diagram of an embodiment for separating P-wave data and S-wave data in the space-time domain.

Continuing with the embodiment, the engine component 204 provides the capability to separate the P-wave data and the S-wave data from the acquired seismic data, e.g., vertical and horizontal component data provided by dataset 206. It should be noted in the embodiment that the calculations are performed in the space-time domain based on solving a matrix of equations, e.g., equation (3) above. Next in the embodiment, an output component 208 provides the separated P-wave data and S-wave data for further processing associated with seismic imaging.

Figure 3:
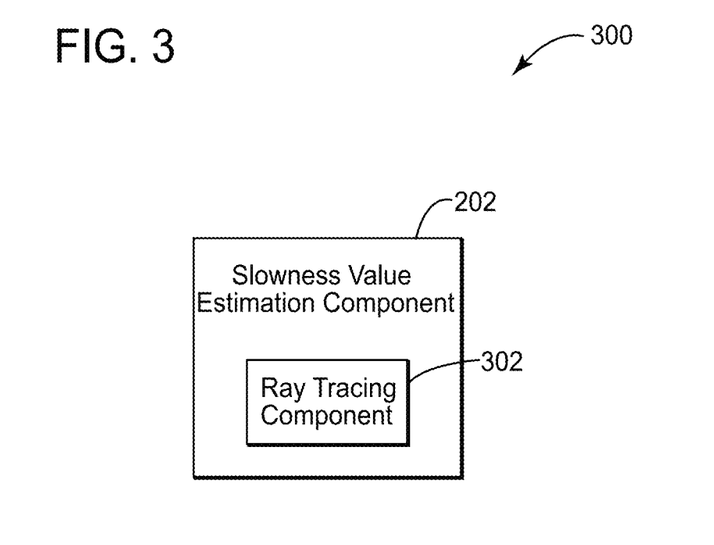
FIG. 3 is a diagram of an embodiment slowness value estimation component further comprising a ray tracing component.
Figure 4:
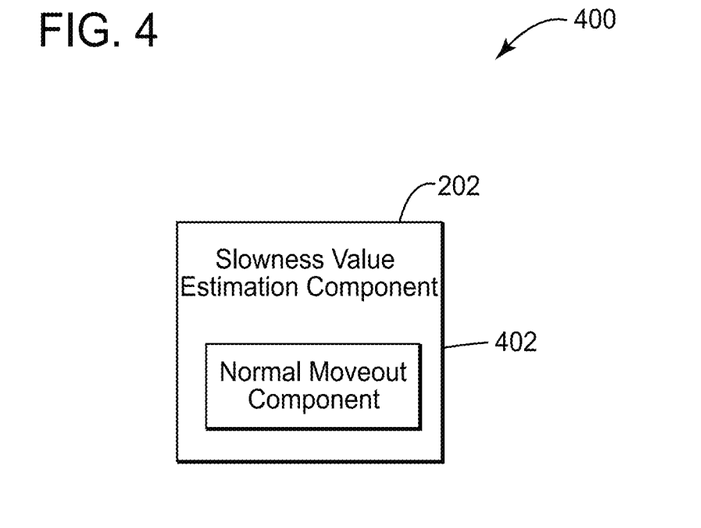
FIG. 4 is a diagram of an embodiment slowness value estimation component further comprising a normal moveout component.

Looking now to FIG. 3, an embodiment 300 of a slowness subsystem is depicted. The embodiment 300 slowness subsystem comprises a slowness value estimation component 202 and a ray tracing component 302. It should be noted in the embodiment that the ray tracing component 302 can be used as one of the techniques to estimate slowness values. In another aspect of the embodiment, the ray tracing component 302 can be used in circumstances of a general depth model where layered media are not present. Looking to FIG. 4, another embodiment 400 of a slowness subsystem is depicted. The embodiment 400 slowness subsystem comprises a slowness value estimation component 202 and a normal moveout component 402. It should be noted in the embodiment 400 that P-wave data slowness values and S-wave data slowness values can be estimated directly from the normal moveout equation.

Figure 5:
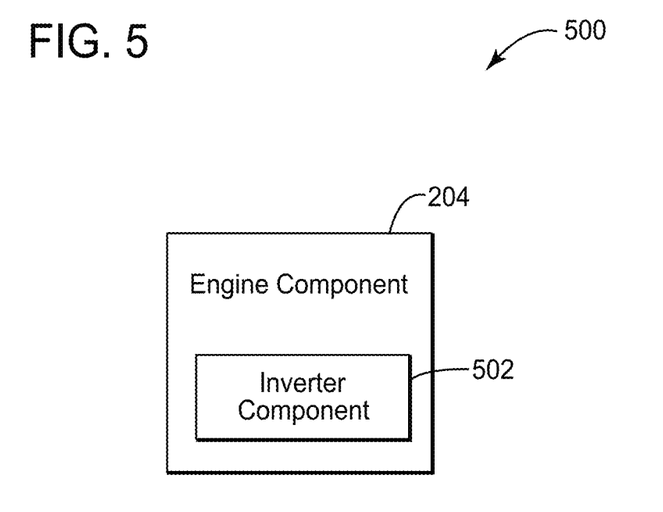
FIG. 5 is a diagram of an embodiment engine component further comprising an inverter component.

Looking now to FIG. 5, an embodiment 500 of an engine subsystem is depicted. The embodiment 500 engine subsystem comprises an engine component 204 and an inverter component 502. It should be noted in the exemplary embodiment that the inverter component 502 can be used to invert specific terms, i.e., $R_V^P(p_{PP})$, in the matrix of equations when only the vertical component is present. Further in the embodiment 500, when horizontal receivers are present, the inverter component 502 can invert the entire matrix of equations for an improved separation.

Figure 6:
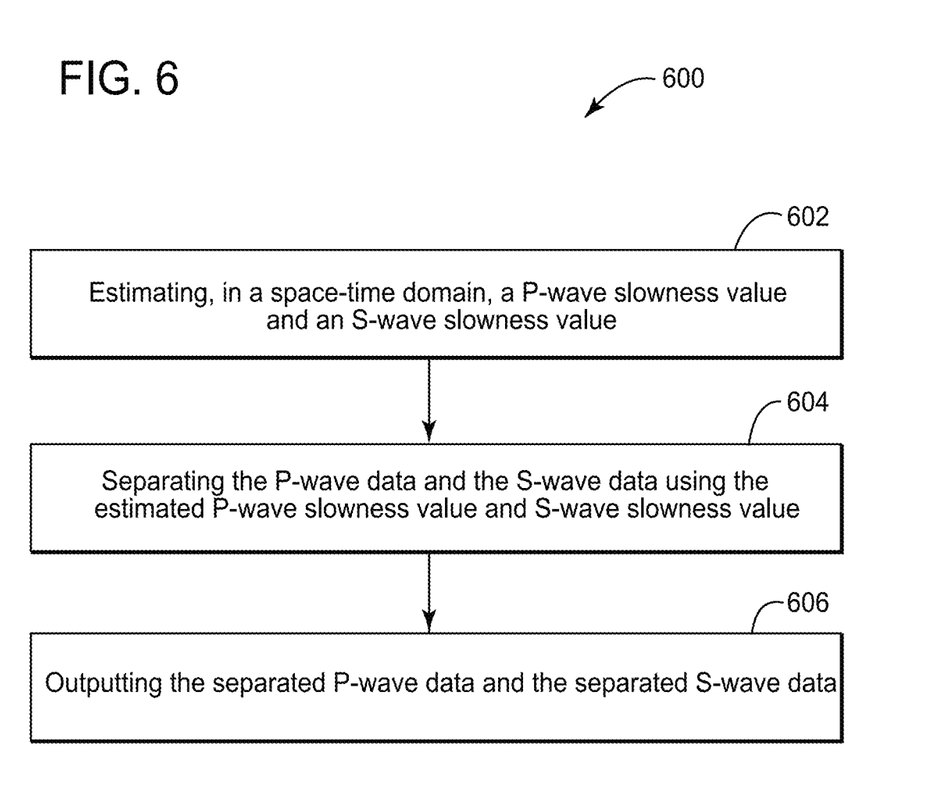
FIG. 6 is a flowchart depicting a method for separating P-wave data and S-wave data in the space-time domain according to an embodiment.

Looking now to FIG. 6, an exemplary method embodiment further describes the steps 600 associated with separating P-wave data and S-wave data, e.g., from acquired seismic data which is aliased and/or irregularly sampled and without requiring statics removal. Starting at step 602 of the exemplary method embodiment, estimation, in the space-time domain, is made for a P-wave slowness value and an S-wave slowness value. It should be noted in the exemplary embodiment that the estimation can be made by a preconfigured technique associated with the exemplary method embodiment such as, but not limited to, ray tracing or directly from a normal moveout equation.

Next, at step 604 of the exemplary method embodiment, a separation is performed of the P-wave data from the S-wave data, in the space-time domain using a matrix of equations which uses the estimated slowness values. It should be noted in the embodiment that the P-wave slowness value for the PP mode and the S-wave slowness value for the PS mode are typically not equal. Continuing at step 606 of the exemplary embodiment, the separated P-wave data and S-wave data are output. It should be noted in the exemplary embodiment that the separated P-wave data and S-wave data can be used in further operations for generating seismic images.

Figure 7:
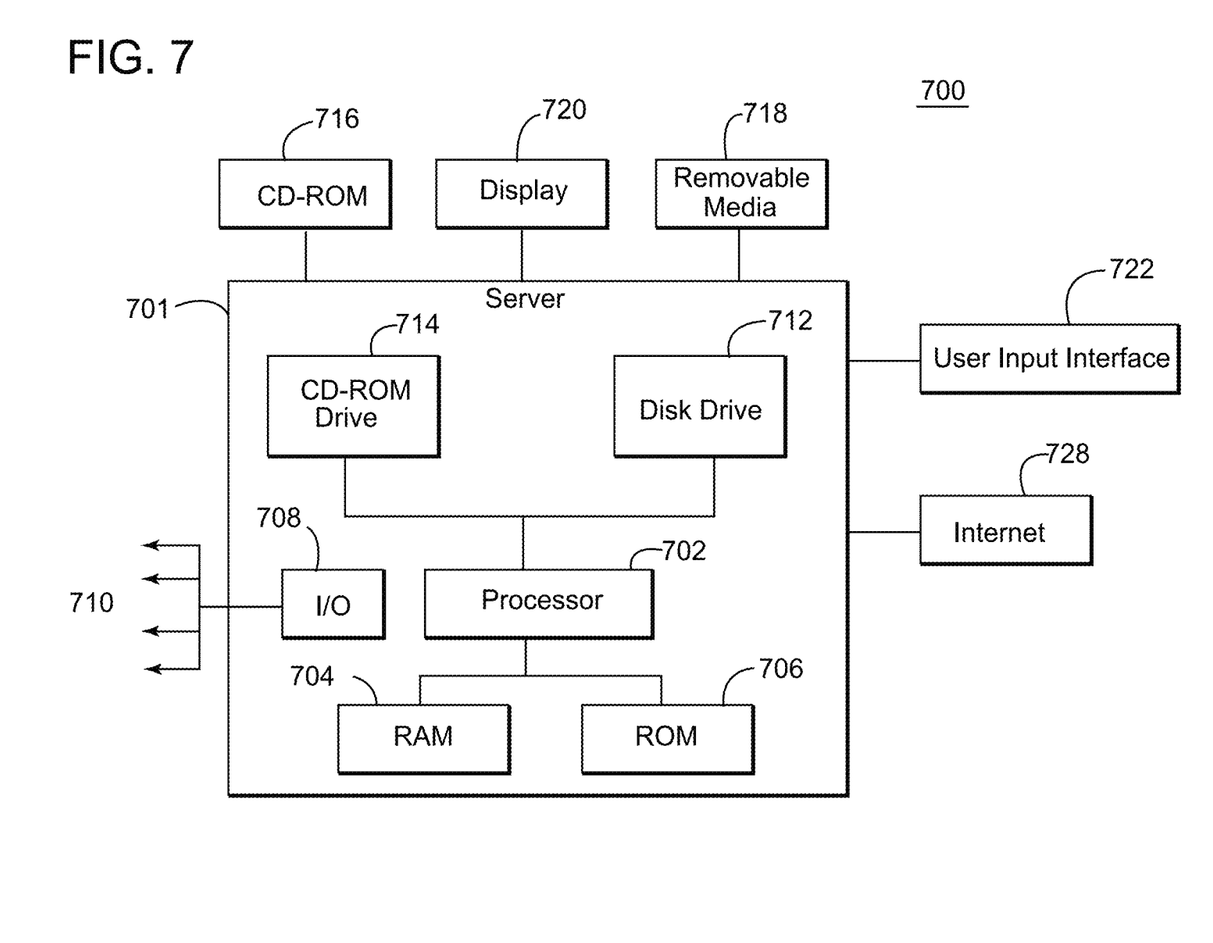
FIG. 7 is a diagram of a server suitable for use as an P-wave data and S-wave data separation system.
Figure 8A:
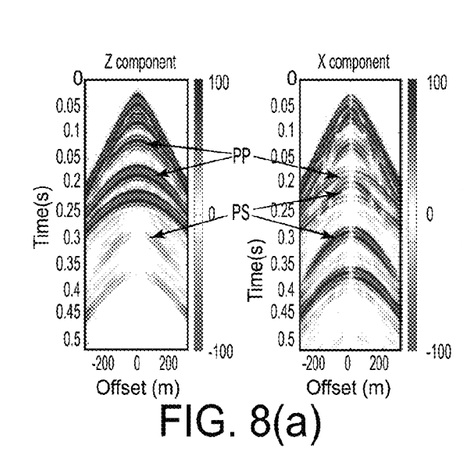
FIGS. 8(a)-8(d) illustrate the application of a conventional PS separation technique and PS separation techniques according to the embodiments to synthetic data.
Figure 8B:
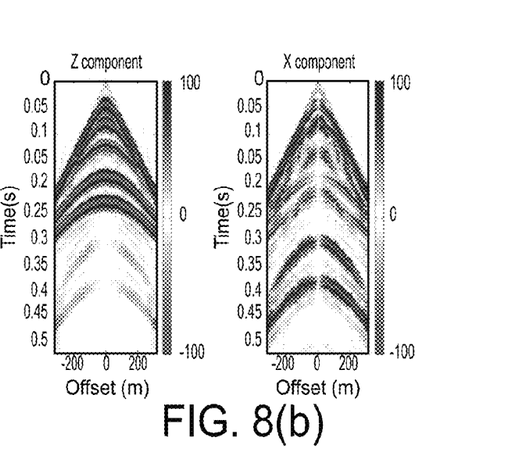
Figure 8C:
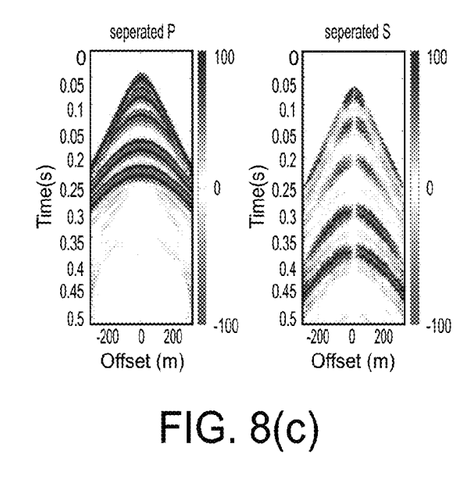
Figure 8D:
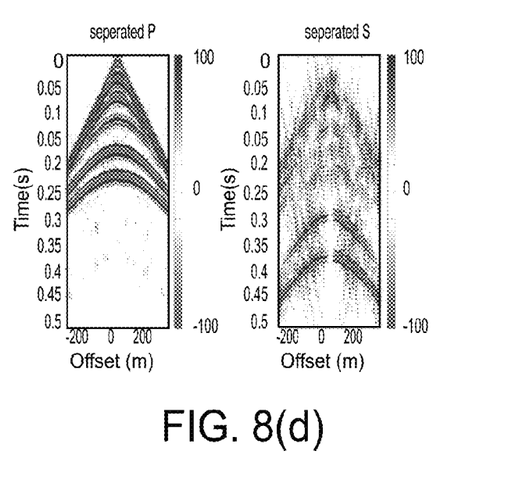

The computing device or other network nodes involved in the separation of P-wave data and S-wave data in connection with the above described embodiments may be any type of computing device capable of processing and communicating seismic data associated with a seismic survey. An example of a representative computing system capable of carrying out operations in accordance with the servers of the exemplary embodiments is illustrated in FIG. 7. Hardware, firmware, software or a combination thereof may be used to perform the various steps and operations described herein. The computing structure 700 of FIG. 7 is an exemplary computing structure that may be used in connection with such a system.

The exemplary computing arrangement 700 suitable for performing the activities described in the exemplary embodiments may include a seismic data quality indicator processing server. Such a server 701 may include a central processor (CPU) 702 coupled to a random access memory (RAM) 704 and to a read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. The processor 702 carries out a variety of functions as is known in the art, as dictated by software and/or firmware instructions.

The server 701 may also include one or more data storage devices, including hard and floppy disk drives 712, CD-ROM drives 714, and other hardware capable of reading and/or storing information such as DVD, etc. In one embodiment, software for carrying out the above discussed steps may be stored and distributed on a CD-ROM 716, diskette 718 or other form of media capable of portably storing information. These storage media may be inserted into, and read by, devices such as the CD-ROM drive 714, the disk drive 712, etc. The server 701 may be coupled to a display 720, which may be any type of known display or presentation screen, such as LCD displays, plasma display, cathode ray tubes (CRT), etc. A user input interface 722 is provided, including one or more user interface mechanisms such as a mouse, keyboard, microphone, touch pad, touch screen, voice-recognition system, etc.

The server 701 may be coupled to other computing devices, such as the landline and/or wireless terminals and associated watcher applications, via a network. The server may be part of a larger network configuration as in a global area network (GAN) such as the Internet 728, which allows ultimate connection to the various landline and/or mobile client/watcher devices.

FIGS. 8($a$)-8($d$) illustrate potential benefits associated with processing seismic data using the above-described embodiments to separate P-wave data and S-wave data. More specifically, FIGS. 8($a$)-8($d$) compare PS separation using Dankbaar's FK method and the embodiments described above using a synthetic data set with different P and S receiver statics. FIG. 8($a$) shows the vertical and horizontal component data from the modeling without statics, with some PP and PS events identified in the figure which are present on both records. In FIG. 8($b$) the same data as from FIG. 8($a$) has been modified to now include different P and S statics. FIGS. 8($c$) and 8($d$) show the results of processing the data in FIG. 8($b$) using the embodiments described above (XT separation method) and the conventional, FK separation method, respectively. By comparing FIGS. 8($c$) and 8($d$), it can be seen that by using the embodiments described herein, the separation of the P-wave data and S-wave data is not significantly affected by the presence of different statics, whereas application of the FK separation method results in a significant amount of undesirable noise.

The embodiments have other potential benefits. For example, the P-S radiation model described above is operational regardless of the software implementation, i.e., parallel or non-parallel processing, the size of the databases, the data dimensions, i.e., two-dimensional (2D) or three-dimensional (3D), and the acquisition design of the P-P data and the P-S data. Moreover, prior knowledge of the statics is not required and the embodiments may be readily applied to aliased and irregularly sampled data. In particular, the exemplary embodiment can be used for 3D shot records.

The disclosed exemplary embodiments provide systems and methods for separating P-wave data and S-wave data associated with seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, stored in a memory and executing on a processor, for separating P-wave data and S-wave data in seismic data acquired over a given subsurface of the earth, said method comprising:
   receiving the seismic data, wherein the seismic data is recorded with receivers that record vertical component data and horizontal component data;
   establishing a forward modelling equation that links the vertical and horizontal component data to the P-wave and S-wave data through a P-wave slowness and an S-wave slowness;
   estimating, in a space-time domain, a P-wave slowness value and an S-wave slowness value;
   separating, in the processor, the P-wave data and the S-wave data using the estimated P-wave slowness value and S-wave slowness value;
   outputting the separated P-wave data and the separated S-wave data; and
   generating an image of the subsurface based on the separated P-wave data and the separated S-wave data, wherein the image is indicative of various layers of the earth,
   wherein the P-wave slowness value is different from the S-wave slowness value.

2. The method of claim 1, wherein said P-wave slowness value and said S-wave slowness value are estimated by ray tracing.

3. The method of claim 1, wherein said P-wave slowness value and said S-wave slowness value are estimated directly from a normal moveout (NMO) equation.

4. The method of claim 1, wherein said P-wave data and said S-wave data is three-dimensional (3D) shot records.

5. The method of claim 1, wherein said step of separating is performed by calculating, $$\begin{bmatrix} U_V \\ U_H \end{bmatrix} \begin{bmatrix} R_V^P(p_{PP}) & R_V^S(p_{PS}) \\ R_H^P(p_{PP}) & R_H^S(p_{PS}) \end{bmatrix}^{-1} = \begin{bmatrix} D_P \\ D_S \end{bmatrix}$$

where $U_V$ is the vertical component data, $U_H$ is the horizontal component data, $D_P$ is the separated P-wave data, $D_S$ is the separated S-wave data, $R_V^P(p_{PP})$ is an amplitude factor for PP measured on a vertical geophone, $R_H^P(p_{PP})$ is an amplitude factor for PP measured on a horizontal geophone, $R_V^S(p_{PS})$ is an amplitude factor for PS measured on a vertical geophone and $R_H^S(p_{PS})$ is an amplitude factor for PS measured on a horizontal geophone.

6. The method of claim 5, wherein said $R_V^P(p_{PP})$ term is inverted to correct for emergence angle amplitude decay when only said vertical component is present.

7. The method of claim 5, wherein said $R_V^P(p_{PP})$ term is defined as $$\frac{-2\gamma\xi(1-2V_S^2 p_{PP}^2)}{R_0(p_{PP})},$$

said $R_H^P(p_{PP})$ term is defined as $$\frac{4V_P p_{PP}\xi\eta}{R_0(p_{PP})},$$

said $R_V^S(p_{PS})$ term is defined as $$\frac{4V_S p_{PS}\xi\eta}{R_0(p_{PS})}$$

and said $R_H^S(p_{PS})$ term is defined as $$\frac{2\eta(1-2V_S^2 p_{PS}^2)}{R_0(p_{PS})}$$

where $\gamma$ equals Vp/Vs, $\xi$ equals $$\left(\frac{Vs}{Vp} - Vs^2 p^2\right)^{1/2},$$

$V_S$ equals an S-wave velocity, $V_P$ equals a P-wave velocity, $p_{PP}$ is a slowness value for said PP mode, $p_{PS}$ is a slowness value for PS mode, $R_0$ equals $(1-2Vs^2p^2)^2+4p^2Vs^2\xi\eta$ and $\eta$ equals $(1-Vs^2p^2)^{1/2}$.

8. The method of claim 7, wherein the receivers associated with collecting said vertical component data and said horizontal component data are sampled in only one direction.

9. The method of claim 7, wherein a receiver spacing is irregular.

10. The method of claim 7, wherein a receiver spacing is sparse.

11. The method of claim 7, wherein P receiver statics and S receiver statics are conflicting.

12. A system for separating P-wave data and S-wave data in acquired seismic, said system comprising:
    a seismic dataset having vertical component data and horizontal component data, the seismic dataset being recorded with seismic receivers; and
    one or more processors configured to receive the seismic dataset and execute computer instructions and a memory configured to store said computer instructions wherein said one or more processors are configured to:
       estimate, in a space-time domain, a P-wave slowness value and an S-wave slowness value using the seismic dataset;
       separate the P-wave data and the S-wave data using (i) a forward modelling equation that links the vertical and horizontal component data to the P-wave and S-wave data through a P-wave slowness and an S-wave slowness, and (ii) estimated P-wave slowness value and S-wave slowness value;

output separated P-wave data and S-wave data; and generate an image of the subsurface based on the separated P-wave data and the separated S-wave data, wherein the image is indicative of various layers of the earth, wherein the P-wave slowness value is different from the S-wave slowness value.

13. The system of claim 12, wherein said slowness value estimation component further comprises a ray tracing component for estimating said P-wave slowness value and said S-wave slowness value.

14. The system of claim 12, wherein said slowness value estimation component further comprises a normal moveout component for estimating said P-wave slowness value and said S-wave slowness value.

15. The system of claim 12, wherein said P-S wave field dataset is three-dimensional (3D) shot records.

16. The system of claim 12, wherein said one or more processors are configured to correct emergence angle amplitude decay when only a vertical component is present.

17. The system of claim 16, wherein said one or more processors are further configured to invert said matrix of equations when horizontal receivers are present and collect a portion of said P-wave data and said S-wave data.

18. The system of claim 12, wherein said one or more processors are configured to separate the P-wave data and the S-wave data by calculating:

$$\begin{bmatrix} U_V \\ U_H \end{bmatrix} \begin{bmatrix} R_V^P(p_{PP}) & R_V^S(p_{PS}) \\ R_H^P(p_{PP}) & R_H^S(p_{PS}) \end{bmatrix}^{-1} = \begin{bmatrix} D_P \\ D_S \end{bmatrix},$$

where $U_V$ is the vertical component data, $U_H$ is the horizontal component data, $D_P$ is the P-wave data, $D_S$ is the S-wave data, $R_V^P(p_{PP})$ is an amplitude factor for PP measured on a vertical geophone, $R_H^P(p_{PP})$ is an amplitude factor for PP measured on a horizontal geophone, $R_V^S(p_{PS})$ is an amplitude factor for PS measured on a vertical geophone and $R_H^S(p_{PS})$ is an amplitude factor for PS measured on a horizontal geophone.

19. The system of claim 18, wherein said $R_V^P(p_{PP})$ term is defined as $$\frac{-2\gamma\xi(1-2V_S^2 p_{PP}^2)}{R_0(p_{PP})},$$

said $R_H^P(p_{PP})$ term is defined as $$\frac{4V_P p_{PP}\xi\eta}{R_0(p_{PP})},$$

said $R_V^S(p_{PS})$ term is defined as $$\frac{4V_S p_{PS}\xi\eta}{R_0(p_{PS})}$$

and said $R_H^S(p_{PS})$ term is defined as $$\frac{2\eta(1-2V_S^2 p_{PS}^2)}{R_0(p_{PS})}$$

where $\gamma$ equals Vp/Vs, $\xi$ equals $$\left(\frac{V_S}{V_P} - V_S^2 p^2\right)^{1/2},$$

$V_S$ equals an S-wave velocity, $V_P$ equals a P-wave velocity, $p_{PP}$ is a slowness value for said PP mode, $p_{PS}$ is a slowness value for PS mode, $R_0$ equals $(1-2V_S^2 p^2)^2+4p^2 V_S^2 \xi\eta$ and $\eta$ equals $(1-V_S^2 p^2)^{1/2}$.

20. The system of claim 12, wherein the acquired seismic data is aliased and irregularly sampled.

* * * * *